United States Patent [19]

Matson et al.

[11] Patent Number: 4,798,562
[45] Date of Patent: * Jan. 17, 1989

[54] TENSIONING DEVICE FOR FLEXIBLE DRIVE ELEMENT

[75] Inventors: Les Matson, Selah; Richard Sela, Yakima, both of Wash.

[73] Assignee: Moxee Innovations Corporation, Moxee City, Wash.

[*] Notice: The portion of the term of this patent subsequent to May 5, 2004 has been disclaimed.

[21] Appl. No.: 2,336

[22] Filed: Jan. 20, 1987

Related U.S. Application Data

[63] Continuation-in-part of Ser. No. 821,295, Jan. 22, 1986, Pat. No. 4,662,862.

[51] Int. Cl.[4] ............................................. F16H 7/08
[52] U.S. Cl. ................................. 474/101; 474/111; 474/140
[58] Field of Search ............... 474/101, 111, 139, 109, 474/134, 135, 137, 138, 140

[56] References Cited

U.S. PATENT DOCUMENTS

| | | | |
|---|---|---|---|
| 1,338,405 | 4/1920 | Stickney | 474/132 |
| 3,295,383 | 1/1967 | Allen | 474/135 |
| 3,926,063 | 12/1975 | Mayfield | 474/132 |
| 3,941,006 | 3/1976 | Brodesser | 474/132 |
| 4,068,535 | 1/1978 | Sheets | 474/132 |
| 4,662,862 | 5/1987 | Matson | 474/101 |

FOREIGN PATENT DOCUMENTS 353797  7/1931  United Kingdom .

Primary Examiner—Thuy M. Bui
Attorney, Agent, or Firm—Christensen, O'3 Connor, Johnson & Kindness

[57] ABSTRACT

A tensioning device (10) for a flexible drive element (16), the tensioning device comprising a first tensioning member (40) having a first contact surface (58), and a second tensioning member (140) having a second contact surface (158). Straps (34, 36) and positioning devices (42, 44, 142, 144) secure the first and second tensioning members a selected distance away from one another. In one arrangement, the positioning devices form a ratchet-like mechanism arranged such that the force required to move the tensioning members toward one another is smaller than the force required to move the tensioning members away from one another. The tensioning device may be operated without any members securing the tensioning device with respect to the sprockets.

5 Claims, 6 Drawing Sheets

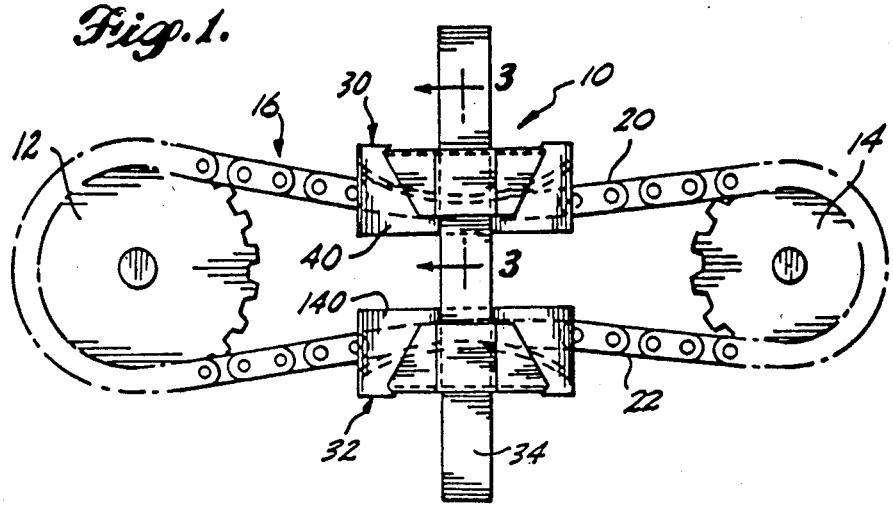
Fig. 1.
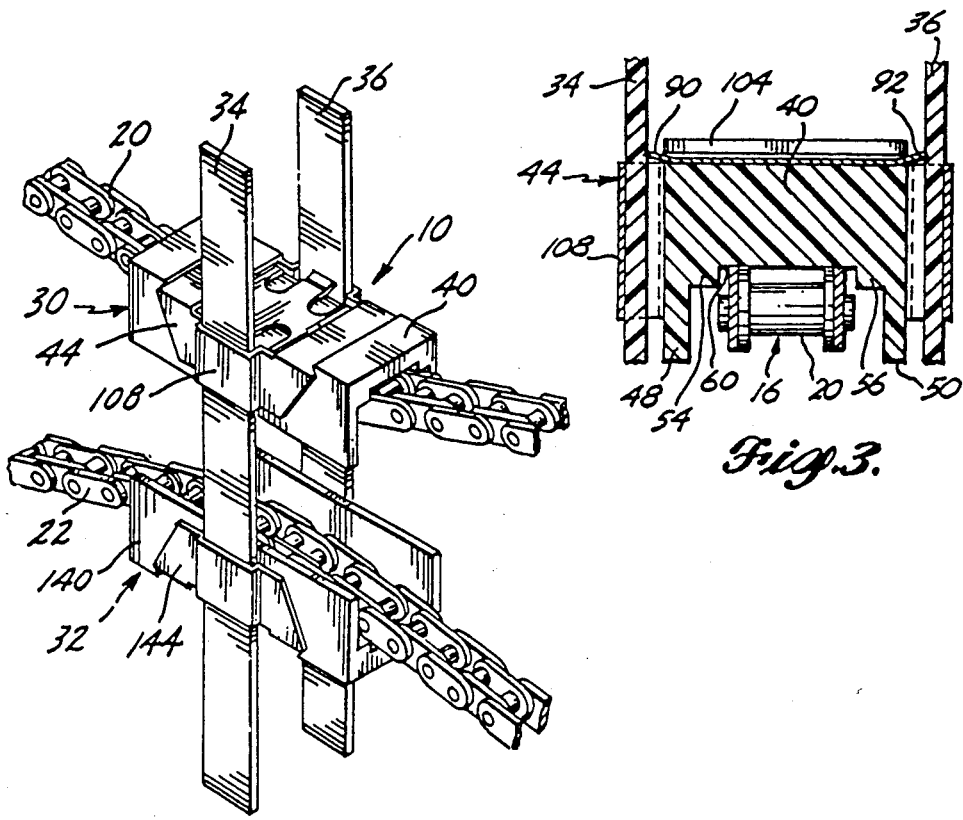
Fig. 2.
Fig. 3.

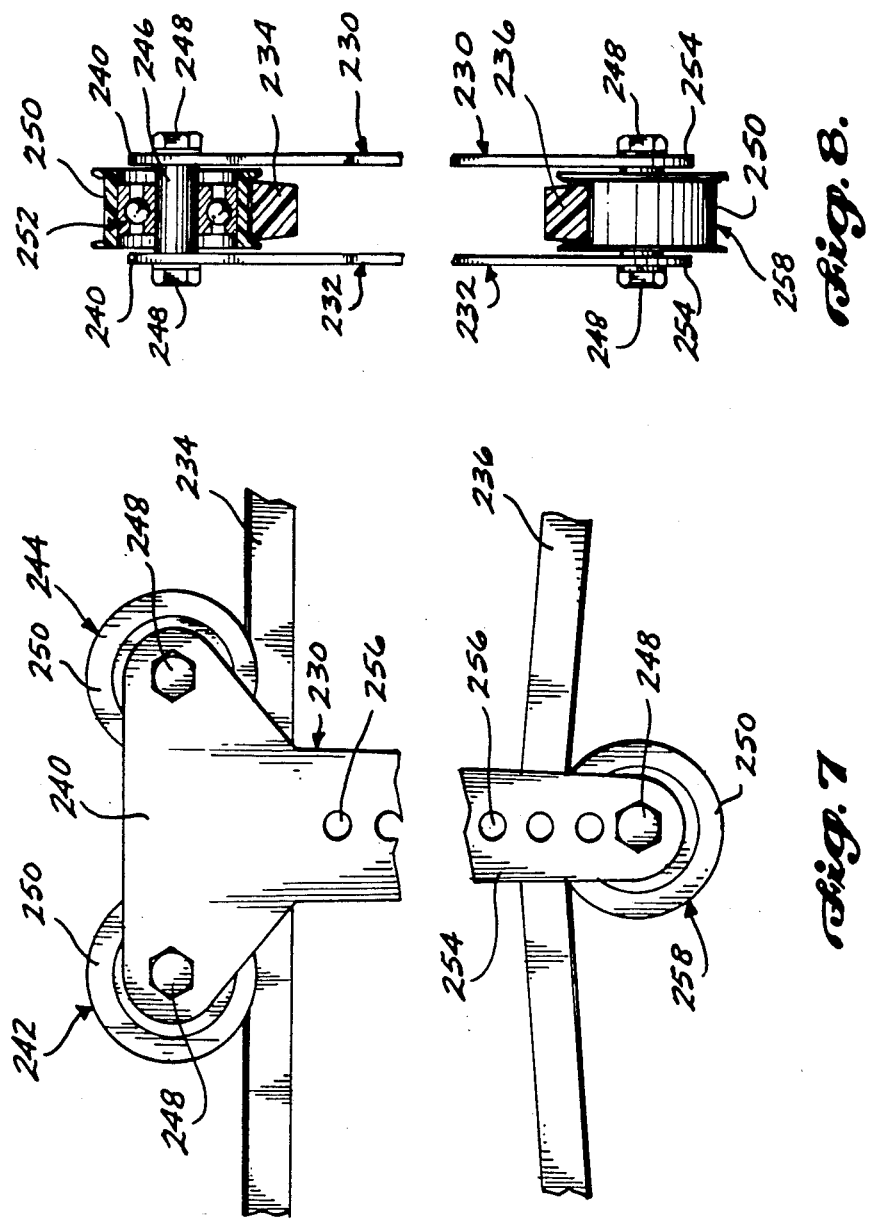

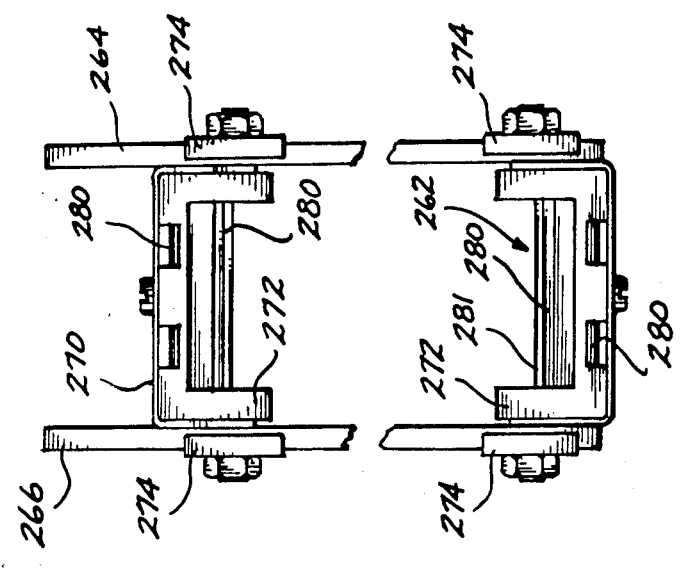
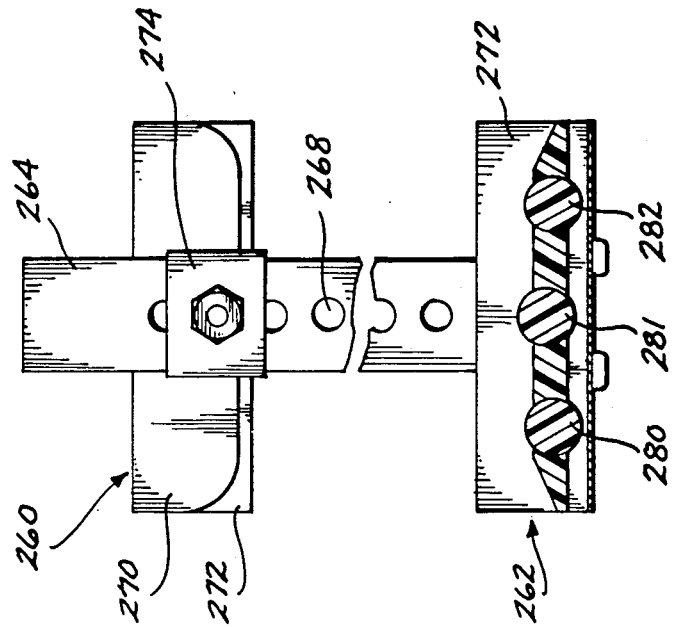

TENSIONING DEVICE FOR FLEXIBLE DRIVE ELEMENT

RELATED APPLICATION

This application is a continuation-in-part of Ser. No. 821,295, filed Jan. 22, 1986, for a Tensioning Device for Flexible Drive Element now U.S. Pat. No. 4,662,862.

FIELD OF THE INVENTION

The present invention relates to tensioning devices for drive systems that include flexible drive elements such as drive chains and drive belts.

BACKGROUND OF THE INVENTION

The present invention is adapted for use with a conventional drive system in which a driven sprocket and a drive sprocket are connected by a flexible drive element such as a drive chain. In such an arrangement, it is well known that the proper functioning of the drive system and the operating life of the drive chain can be significantly enhanced by maintaining the two drive chain runs between the sprockets in tension such that significant slack does not occur in either run. One means of providing such tension is to resiliently bias the sprockets away from one another. However, a more common and typically more convenient arrangement is to provide a tensioning device that biases one or both drive chain runs inward towards the other run at a point intermediate the sprockets. A number of examples of this latter type of tensioning device are disclosed in the prior art. However, in the great majority of prior tensioning devices, the tensioning device is adapted to operate in a particular driven system, e.g., to operate with a given arrangement of sprockets and drive chain.

One result of the fact that prior tensioning devices have been adapted for specific applications is that in essentially all cases, prior tensioning devices have been mounted or secured to a support that is fixed with respect to the sprocket axles. Through use of such a support arrangement, the position of the tensioning device between the sprockets can be controlled, to maintain the tensioning device at the optimum position. The use of fixed supports has been viewed as especially important for tensioning devices adapted to operate with sprockets that are or may be horizontally positioned with respect to one another. In such a horizontal arrangement, the weight of the tensioning device does not affect its position, i.e., the position of the tensioning device between the sprockets is not in any way controlled by gravity acting on the tensioning device.

A further feature of essentially all prior art tensioning devices is that in such devices, the surfaces contacting the two runs of drive chain and urging them inward have either been fixed in position with respect to one another, or resiliently biased towards one another by springs or similar means. A disadvantage of the resilient biasing technique is that it adds complexity to the tensioning device, and the resilient means are themselves subject to wear over time. Tensioning devices having fixed distances between their contact surfaces cannot be adjusted as the chain experiences increased wear. Thus, the tensioning force provided by the device decreases over time, at least in those arrangements where the sprockets are horizontally positioned with respect to one another. A further disadvantage of a fixed distance between contact surfaces is that the tensioning device cannot be used with different sized sprockets.

SUMMARY OF THE INVENTION

The present invention provides a tensioning device that overcomes a number of the limitations of prior tensioning devices. The tensioning device of the present invention is adapted for use with a drive system having a flexible drive element extending between sprockets, pulleys or the like. The tensioning device comprises first and second tensioning members, the tensioning members having respective first and second contact means for contacting the drive element. The tensioning device further comprises positioning means for securing the first and second tensioning members to one another. The positioning means comprises at least one connecting member extending between the first and second tensioning members, the connecting member securing the tensioning members in spaced relationship to one another. In such spaced relationship, the contact means face one another, and are spaced apart from one another by a distance sufficient to permit first and second runs of the drive element to pass between the tensioning members in contact with the first and second contact means respectively. The positioning means also include adjustment means for permitting at least one tensioning member to be secured to the connecting member at a plurality of positions, such that the spacing between the contact means can be adjusted.

As a result of the described arrangement, the positioning means holds the tensioning members a fixed distance from one another during operation of the drive system. Therefore when the tensioning device is in contact only with the drive element, the tensioning device can respond to fluctuations in load on the drive element by moving in a direction parallel to the drive element at the points of contact between the drive element and the tensioning members. In a preferred arrangement, the positioning means includes first and second connecting members, each connecting member extending between and secured to the first and second tensioning members. The connecting members are spaced apart by a distance sufficient to permit the drive element to pass between the connecting members. Preferably, at least one of the tensioning members can be entirely disengaged from the connecting members. Another preferred feature is that the connecting member is elongated along an axis extending between the tensioning members, and torsionally compliant along such axis, such that the tensioning members can rotate with respect to one another about such axis, in response to misalignment between the first and second runs of the drive element.

In one preferred embodiment, the positioning means includes a ratchet-like mechanism arranged such that the force required to move the tensioning members towards one another is smaller than the force required to move the tensioning members away from one another. In a second preferred embodiment, each connecting member includes a series of openings spaced along its length, to permit the tensioning members to be positioned at a selected distance from one another. In another embodiment, each connecting member includes a series of closely spaced, crosswise extending serrations, and each tensioning member includes a fastening member having a blade-like edge and means for forcing the edge against the connecting member, to secure the tensioning member to the connecting member. In another arrangement, each tensioning member comprises one or more rollers, the contact means comprising the outer circumferential surfaces of said rollers. The tensioning member also includes means for mounting each roller such that the roller is free to rotate with respect to the positioning means in response to relative movement between the positioning means and the drive element in contact with the outer circumferential surface of the roller. In a further embodiment, at least one tensioning member includes a body having one or more cylindrical openings within which one or more cylindrical rollers are positioned, such that the contact means comprises the outer circumferential surface of each roller.

BRIEF DESCRIPTION OF THE DRAWINGS

FIG. 1 is a side elevational view of one embodiment of the tensioning device of the present invention used in connection with a drive chain;

FIG. 2 is a perspective view of the tensioning device of FIG. 1;

FIG. 3 is a cross-sectional view taken along line 3—3 of FIG. 1;

FIG. 7 is a side elevational view of a fourth preferred embodiment of the present invention;

FIG. 8 is an end elevational view, partly in cross section, of the embodiment of FIG. 7;

FIG. 9 is a side elevational view, partly in cross section, of a fifth preferred embodiment of the present invention; and FIG. 10 is an end elevational view of the embodiment of FIG. 9.

DETAILED DESCRIPTION OF THE DRAWINGS

Figure 4:
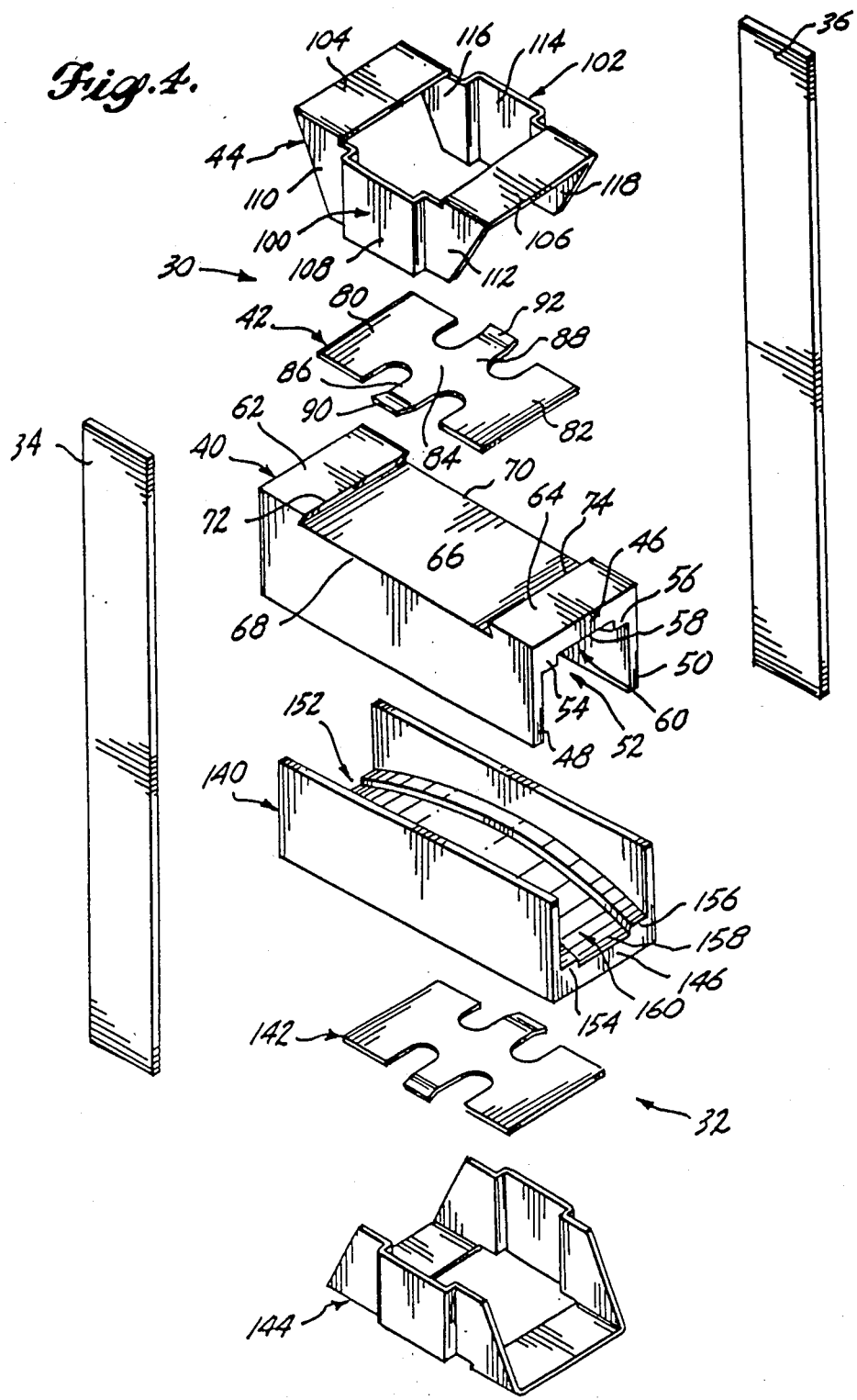
FIG. 4 is an exploded perspective view of the tensioning device of FIG. 1.

FIGS. 1 and 2 illustrate tensioning device 10 of the present invention used in connection with a conventional drive system that includes sprockets 12 and 14 interconnected by drive chain 16. An upper run 20 of the drive chain extends between the upper sides of sprockets 12 and 14, and lower run 22 extends between the lower sides of the sprockets. Depending upon which of sprockets 12 and 14 is driven and upon the direction of such drive, either upper run 20 or lower run 22 will be placed under tension by the driving mechanism. However, in the absence of the tensioning device of the present invention, the other run will be slack, thereby increasing chain wear and ultimately leading to the possibility that the chain will come off one of the sprockets.

Tensioning device 10 comprises upper assembly 30 and lower assembly 32 interconnected by straps 34 and 36. Upper assembly 30 includes block 40 that engages upper run 20, and lower assembly 32 includes block 140 that engages lower run 22. The blocks are connected to the straps by ratchet-like arrangements, described below, such that the blocks can be moved toward one another upon application of a comparatively small force, but can be moved away from one another only upon application of a comparatively large force, or by use of a separate tool. Thus during operation of the tensioning device, straps 34 and 36 hold the upper and lower assemblies in fixed position with respect to one another, despite the tension exerted by drive chain 16 tending to move blocks 40 and 140 away from one another. However, the tensioning device of the present invention can readily be adjusted to decrease the separation between the blocks during the like of the drive chain, to take up slack caused by increasing drive chain wear. Furthermore, when the tensioning device of the present invention is installed on a drive chain or other flexible drive means, the distance between the blocks can be varied over a wide range, and the tensioning device can therefore be used for a wide range of sprocket sizes and distances between the upper and lower runs.

A further important feature of the present invention is that it is capable of operation without any means for positioning the tensioning device on runs 20 and 22 between the sprockets. This is true for all positions of the sprockets with respect to one another, including the horizontal position shown in FIG. 1. It is also true regardless of which of sprockets 12 and 14 is the drive sprocket and regardless of the direction of rotation of the sprockets. The tensioning device of the present invention therefore provides a device having a wide range of applications to different drive systems. It is to be understood that the present invention is also applicable to drive systems in which the flexible drive element comprises an O-ring, a V-belt or other drive belt, a rope, a bead chain, or any other flexible drive element.

In a conventional tensioning arrangement, the upper and lower assemblies or their equivalents are resiliently mounted to an external structure such that they can move in directions normal to the drive element, to accommodate the inevitable fluctuations in load or tension during operation of the drive system. By contrast, in the tensioning device of the present invention, the tensioning members are secured a fixed distance from one another, but the tensioning device can move along the drive element to accommodate fluctuations. This movement along the drive element provides a very effective vibration and shock absorber mechanism. In addition, unlike a conventional arrangement, shock and vibration are not transmitted through the tensioning device to an external structure.

Referring now principally to FIG. 4, upper assembly 30 comprises block 40, blade member 42, and clip 44. Similarly, lower assembly 32 comprises block 140, blade member 142 and clip 144. In the preferred embodiment illustrated in FIGS. 1-4, the elements of the upper and lower assemblies are identical to one another, and a numbering scheme is used in which elements of the lower assembly are assigned reference numerals 100 greater than the reference numerals of the corresponding elements of the upper assembly. Where the context permits, reference in the following description to an element of one of assemblies 30 and 32 shall be understood as also referring to the corresponding element in the other assembly.

Block 40 includes center portion 46 from which identical sidewalls 48 and 50 extend to form U-shaped channel 52. The side of center portion 46 that faces inwardly into channel 52 comprises contact surface 58 flanked by rails 54 and 56. The rails and contact surface have a common arcuate shape, and the height of the rails above the contact surface is constant, to thereby form convex groove 60 that extends the full length of channel 52. Upper run 20 of drive chain 16 rides in groove 60, as best indicated in FIG. 3. Rails 54 and 56 keep the sides of chain 16 away from sidewalls 48 and 50, thereby minimizing friction between the drive chain and the block.

The surface of center portion 46 that faces away from channel 52 includes projections 62 and 64 at opposite longitudinal ends of the center portion, and mounting surface 66 between the projections. Mounting surface 66 includes lateral edges 68 and 70. The inner edges of projections 62 and 64 include lips 72 and 74 that are slightly overhanging with respect to the adjacent portions of mounting surface 66.

Blade member 42 includes end sections 80 and 82 and center section 84. Center section 84 includes laterally extending blades 86 and 88. The outer edges of blades 86 and 88 include tips 90 and 92 that are angled slightly out of the plane of the blade member in a direction away from mounting surface 66 and block 40. The function of blades 86 and 88 is described below.

Clip 44 includes side pieces 100 and 102 interconnected by top pieces 104 and 106. Side piece 100 comprises center portion 108 that is shaped to form a shallow, inwardly facing, U-shaped groove. Center portion 108 is flanked by end portions 110 and 112. Similarly, side piece 102 comprises center portion 114 flanked by end portions 116 and 118, center portion 114 also being shaped to form a shallow, inwardly facing, U-shaped groove. Top piece 104 interconnects end portions 110 and 116, and top piece 106 interconnects end portions 112 and 118.

Blade members 42 and 142 and clips 44 and 144 are preferably constructed of a metal such as steel. Blocks 40 and 140 and straps 34 and 36 are preferably constructed from a low friction material such as ultra high molecular weight polyethylene (*UHMW*). A low-friction material available from du Pont under the trademark Nylontron is also suitable. Upper assembly 30 is formed by placing blade member 42 on mounting surface 66, and then forcing clip 44 over the top and sides of block 40 such that the longitudinal edges of top pieces 104 and 106 are retained under lips 72 and 74 respectively. The longitudinal extent of blade member 42 is slightly less than the distance between lips 72 and 74. Similarly, the lateral extent of end sections 80 and 82 are slightly less than the lateral extent of the block. However, tips 90 and 92 extend slightly over respective edges 68 and 70, as best illustrated in FIG. 3. The formation of lower assembly 32 is identical to that of the upper assembly. Clips 44 and 144 are formed such that straps 34 and 36 can be inserted in the slots formed by the center portions of the clips and the adjacent sidewalls of the corresponding blocks. For example, the upper end of strap 34 may be inserted through the slot formed by center portion 108 of clip 44 and the adjacent lateral surface of block 40, as shown in FIGS. 2 and 3. When strap 34 is so inserted, the strap makes contact with tip 90, as illustrated in FIG. 3. Because tip 90 is angled slightly upward and away from block 40, the result is a ratchet-like arrangement in which strap 34 can be moved upward in the slot upon application of a comparatively small force, but can be moved downward in the slot only upon application of a large force, or by manipulation of blade 86 by a separate tool. The U-shaped openings between center section 84 and end sections 80 and 82 of blade member 42 permit insertion of a screwdriver or other tool under the blades, such that the blades can be raised above mounting surface 66 to move tip 90 or 92 upward and away from the block. Such upward movement of the blade tips disengages the tips from the straps, to thereby permit the straps to be moved downwardly with respect to the upper assembly. The connections between lower assembly 32 and straps 34 and 36 are identical to that described for the upper assembly.

When the tensioning device of the present invention is initially applied to a drive chain, drive belt or other flexible drive member, straps 34 and 36 are first inserted a short distance into one of the assemblies, such as the upper assembly, and the partially-formed tensioning device comprising the upper assembly and straps is then placed over one of the runs of the drive chain. The other assembly is then placed on the opposite side of the other drive chain run, and the straps are inserted into that assembly. The upper and lower assemblies are then manually moved closer together until the tensioning device exerts an appropriate force on the drive chain runs. When the drive system is in operation, the driven chain runs pass through grooves 60 and 160 of blocks 40 and 140, respectively. When the blocks are spaced an appropriate distance from one another, the tensioning device maintains a fixed average position between the sprockets during operation of the drive system, without the use of any auxiliary means to position the tensioning device with respect to the sprockets. The best separation of the blocks may readily be determined by initially setting the blocks a comparatively large distance apart, and then operating the drive system and gradually decreasing the block separation until the optimum position is found. As the drive system experiences wear over a comparatively long time period, drive chain 16 will exhibit increased amount of slack. Adjustment for such slack can again be readily made by manually forcing the blocks together, again until the optimum position is found. Removal of the tensioning device from the drive chain can best be accomplished by means of a screwdriver or the like, to force blade tips away from the straps, as described above.

Figure 5:
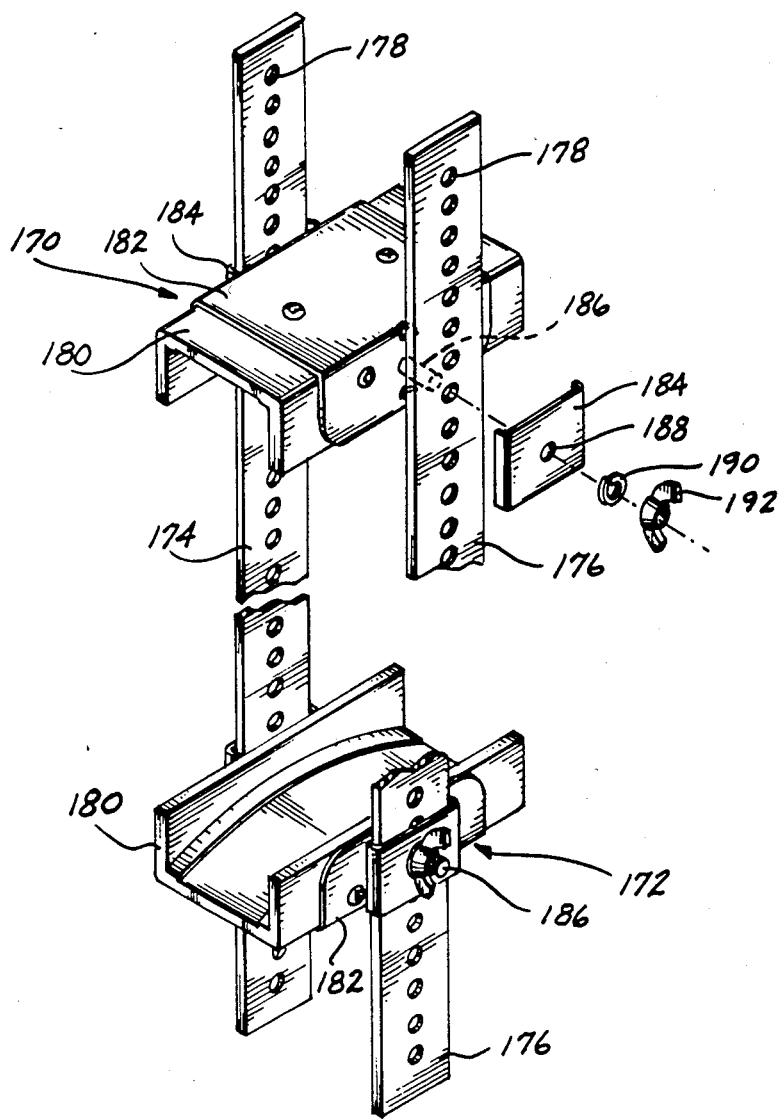
FIG. 5 is a perspective view of a second preferred embodiment of the invention.

A second preferred embodiment of the tensioning device of the present invention is illustrated in FIG. 5. This embodiment comprises upper assembly 170 and lower assembly 172 interconnected by straps 174 and 176. Straps 174 and 176 each include a series of equal sized, vertically spaced openings 178. Upper assembly 170 and lower assembly 172 each includes block 180, U-shaped bracked 182 and a pair of plates 184 positioned on opposite sides of the assembly. Each block 180 may have a shape and composition similar to that of blocks 40 and 140 of FIGS. 1–4. Brackets 182 are fastened to their respective blocks by any suitable means such as screws or rivets. Threaded shafts 186 extend laterally from either side of brackets 182 (only two shafts 186 shown in FIG. 5). Shafts 186 are dimensioned so that they can pass through openings 178 in straps 174 and 176. Each plate 184 includes a centrally positioned opening 188 through which shafts 186 can also pass. Washers 190 and wing nuts 192 are provided for securing the plates and straps to brackets 182.

In order to secure upper assembly 170 and lower assembly 172 to one another at a predetermined spacing from one another, nuts 912, washers 190 and plates 188 are removed from the assembly, as shown in the upper right portion of FIG. 5, and shafts 186 are positioned in the appropriate openings 178. The plates, washers and nuts are then secured together, as shown in the lower portion of FIG. 5, to produce a complete tensioning device assembly.

Unlike the embodiment of FIGS. 1–4, the embodiment of FIG. 5 does not include a ratchet-like mechanism for securing the upper and lower assemblies to the straps. However the tensioning device of FIG. 5 can readily be adjusted to decrease or increase the separation between the blocks during the life of hte drive chain, for example, to take up slack caused by increasing drive chain wear Like the embodiment of FIGS. 1-4, the embodiment of FIG. 5 is also capable of operation without any means for positioning the tensioning device to an external structure. This is true for all positions of the sprockets with respect to one another, and regardless of which of sprockets 12 and 14 (see FIG. 1) is the drive sprocket, and regardless of the direction of rotation of the sprockets.

Figure 6:
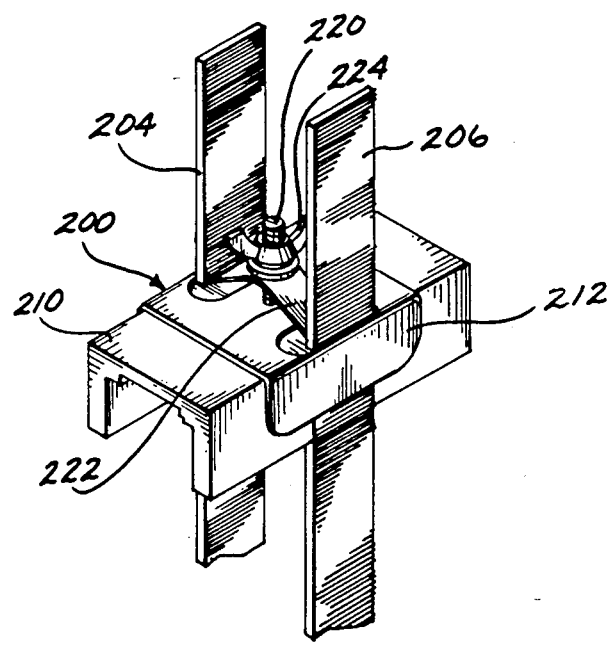
FIG. 6 is a partial perspective view of a third preferred embodiment of the present invention.

A third embodiment of the tensioning device of the present invention is illustrated in partial view in FIG. 6. FIG. 6 illustrates upper assembly 200 secured to straps 204 and 206. Each of the straps includes a series of closely spaced horizontal serrations. Upper assembly 200 includes block 210 and bracket 212, the bracket being secured to the block by any suitable means (not shown) such as by rivets. The lateral sides of block 210 include channels to accommodate the straps. Threaded shaft 220 extends upwardly from bracket 212, or extends upwardly from block 210 through an opening in bracket 212. V-shaped spring metal clip 222 is positioned between straps 204 and 206, and includes a central opening through which shaft 220 extends. The clip may be secured to the upper assembly via wing nut 224 and one or more washers. By tightening wing nut 224, clip 222 is forced downward, forcing the outer, bladelike edges of the clip to bear against the inner, serrated surfaces of straps 204 and 206, thereby securing the upper assembly to the straps. In contrast with the embodiment of FIG. 5, this arrangement permits an essentially continuous adjustment of the position of the upper and lower assemblies with respect to one another.

A fourth embodiment of the present invention is illustrated in FIGS. 7 and 8. In this embodiment, a pair of generally T-shaped carriers 230 and 232 are positioned in aligned, spaced relationship to one another on opposite sides of upper run 234 and lower run 236 of a drive belt. The upper end 240 of each carrier includes a pair of laterally spaced openings at which a pair of respective upper rollers 242 and 244 are secured between the upper ends 240 of the carriers. Each roller includes a central shaft 246 that is secured between the carriers by a pair of nuts 248, and an outer, circumferential contact sleeve 250 mounted on the shaft by a suitable bearing assembly 252. The outer surface of the upper contact sleeve is U-shaped, and adapted for contacting the drive belt. As shown in FIG. 7, rollers 242 and 244 mount the tensioning device on upper run 234.

Each carrier includes downwardly depending stem 254 that includes a series of equal sized, vertically spaced openings 256. A lower roller 258 is mounted between the stems at a selected pair of openings 256. As shown in the figures, lower roller 258 is adapted for contacting lower run 236 of the drive belt. The distance between lower roller 258 and upper rollers 242 and 244 may be adjusted by selecting the openings 256 between which the lower roller is mounted. In general, one or more rollers may be used at either (upper or lower) end of the tensioning device. FIGS. 7 and 8 show a preferred arrangement, with a single roller at one end and a plurality of rollers at the other end.

A further embodiment of the invention is illustrated in FIGS. 9-10. This embodiment includes upper assembly 260 and lower assembly 262 interconnected by straps 264 and 266. Each strap includes a series of equal sized, horizontally spaced openings 268. Each of the upper and lower assemblies includes bracket 270, block 272 and plate 274. The upper and lower assemblies may be secured to the straps by a technique identical or similar to that shown in FIG. 5. In the embodiment of FIGS. 9-10, each block includes an embedded triplet of rollers for reducing the friction between the flexible drive element and the blocks. In particular, referring to the lower portion of FIG. 9, each block includes three openings cut through the block in a horizontal direction normal to the direction of movement of the flexible drive element. Cylindrical rollers 280-282 are positioned in the openings, the fit between the rollers and the block being loose enough to permit the rollers to readily rotate as a flexible drive element passes over them. Thus the contact surfaces of the blocks comprise the outer circumferential surfaces of rollers 280-282. The central roller 281 is preferably positioned slightly higher than the end rollers 280 and 282, to match the slight bend that the flexible drive element will typically have in passing over the block (see FIGS. 1, 2 and 7). Blocks 272 and rollers 280-282 are preferably composed of a low friction, plastic material, to minimize heating of the blocks in use.

In all of the described embodiments, the upper and lower assemblies are preferably interconnected by straps that are constructed to permit a certain amount of rotation of the assemblies with respect to one another about a vertical axis that extends through the upper and lower assemblies between the straps. Thus slight misalignment of the upper and lower runs of the flexible drive element will be accommodated by misalignment of the upper and lower assemblies, and will not cause increased friction or binding between the driven element and the assemblies.

While the preferred embodiment of the invention has been illustrated and described, it should be understood that variations will be apparent to those skilled in the art. Accordingly,t he invention is not to be limited to the specific embodiments illustrated and described, and that the true scope and spirit of the invention are to be determined by reference to the following claims.

The embodiments of the invention in which an exclusive property or privilege is claimed are defined as follows:

1. A tensioning device for a drive system having a flexible, endless chain drive element, the tensioning device comprising:
   a first tensioning member having a first contact surface for contacting the drive element;
   a second tensioning member having a second contact surface for contacting the drive element, wherein the first and second contact surfaces are stationary with respect to the respective tensioning members; and
   positioning means for securing the first and second tensioning members to one another, the positioning means comprising at least one connecting member extending between the first and second tensioning members, the connecting member securing the tensioning members in spaced relationship to one another with the first and second contact surfaces facing one another and spaced apart by a distance sufficient to permit first and second runs of the drive element to pass between the tensioning members in contact with the first and second contact surfaces, respectively, the connecting member including a plurality of openings, and at least one tensioning member including a projection adapted to pass through one of said openings in the connecting member for connecting the tensioning member to the connecting member to thereby permit adjustment of the spacing between the contact surfaces by permitting at least one tensioning member to be secured to the connecting member at a plurality of positions, whereby the positioning means holds the tensioning members a fixed distance from one another during operation of the drive system, such that when the tensioning device is in contact only with the drive element, the tensioning device can respond to fluctuations in load on the drive element by moving in a direction parallel to the drive element at the points of contact between the drive element and the tensioning members.

2. The tensioning device of claim 1, wherein the positioning means includes first and second connecting members, each connecting member extending between and secured to the first and second tensioning members, the connecting members being spaced apart by a distance sufficient to permit the drive element to pass between the connecting members.

3. The tensioning device of claim 2, wherein at least one of the tensioning members can be entirely disengaged from the connecting members.

4. The tensioning device of claim 1, wherein the connecting member is elongated along an axis extending between the tensioning members and torsionally compliant along such axis, whereby the tensioning members can rotate with respect to one another about said axis in response to misalignment between the first and second runs of the drive element.

5. The tensioning device of claim 1, wherein each tensioning member is shaped to form a channel in one surface thereof, the channel including an elongated central portion comprising the respective contact surface, flanked by a pair of rails that extend outward from the contact surface on either side thereof, the contact surface and rails defining a groove through which the flexible device element rides, the height of the rails above the contact surface being less than the thickness of the flexible drive element.

* * * * *

UNITED STATES PATENT AND TRADEMARK OFFICE
CERTIFICATE OF CORRECTION

PATENT NO. : 4,798,562

DATED : January 17, 1989

INVENTOR(S) : L. Matson et al.

It is certified that error appears in the above-identified patent and that said Letters Patent is hereby corrected as shown below:

```
Attorney, Agent or Firm,
Front page:          "O'3 Connor" should be --O'Connor--
Abstract, line 13:   "members" should be --means--
Column 1, line 7:    "for" should be --For-- (second occurrence)
Column 1, line 35:   "driven" should be --drive--

Column 4, line 5:    "like" should be --life--
Column 5, line 35:   "Nylontron" should be --NYLONTRON--
Column 6, line 17:   "driven" should be --drive--
Column 6, line 60:   "912" should be --192--
Column 7, line 4:    "hte" should be --the--
Column 7, line 6:    "wear Like" should be --wear. Like--
Column 8, line 40:   "Accordingly,t he" should be --Accordingly, the--
```

Signed and Sealed this

Twenty-first Day of November, 1989

*Attest:*

JEFFREY M. SAMUELS

*Attesting Officer*     *Acting Commissioner of Patents and Trademarks*